United States Patent
Hallett

[11] Patent Number: 5,987,906
[45] Date of Patent: Nov. 23, 1999

[54] PIPE FREEZING APPARATUS

[75] Inventor: Trevor Hallett, Harrow, United Kingdom

[73] Assignee: Freeze Master Limited, United Kingdom

[21] Appl. No.: 08/856,201

[22] Filed: May 14, 1997

[30] Foreign Application Priority Data

May 14, 1996 [GB] United Kingdom .................... 9609985

[51] Int. Cl.⁶ .................................................. F25B 41/04
[52] U.S. Cl. .................................. 62/199; 62/231; 62/293
[58] Field of Search .............................. 62/199, 200, 293, 62/231

[56] References Cited

U.S. PATENT DOCUMENTS

| 2,123,497 | 7/1938 | Buchanan | 62/205 |
| 2,182,318 | 12/1939 | Newill | 62/200 |
| 4,122,892 | 10/1978 | Delaporte | 62/199 |
| 4,416,118 | 11/1983 | Brister | 62/66 |
| 4,637,220 | 1/1987 | Sakano | 62/200 |
| 5,156,016 | 10/1992 | Day | 62/199 |
| 5,548,965 | 8/1996 | Chen et al. | 62/293 |

FOREIGN PATENT DOCUMENTS

| 145114 | 6/1985 | European Pat. Off. . |
| 3916025 | 11/1990 | Germany . |
| 61-91439 | 5/1986 | Japan . |
| 2033066 | 5/1980 | United Kingdom . |
| 2168137 | 6/1986 | United Kingdom . |
| 2168467 | 6/1986 | United Kingdom . |

Primary Examiner—William E. Tapolcai
Attorney, Agent, or Firm—Ostrolenk, Faber, Gerb & Soffen, LLP

[57] ABSTRACT

A pipe freezing apparatus 2 has pipe freezer heads 12a, 12b supplied with refrigerant by a compressor 4. The freezer heads 12a, 12b comprise expansion chambers in which the refrigerant expands, to cool the heads. A valve 10 alternately diverts flow of the refrigerant to the freezer heads 12a, 12b. When a supply to a head 12a, 12b is shut off, the compressor lowers the pressure in the head, resulting in enhanced cooling when supply to the head is restored. The compressor 4 can be run continuously while the cooling at the heads is controlled.

4 Claims, 5 Drawing Sheets

PIPE FREEZING APPARATUS

BACKGROUND OF THE INVENTION

1. Field of the Invention

The present invention relates to pipe freezing apparatus, and in particular to a valve or switching unit for controlling the flow of refrigerant through a freezer head.

2. Description of the Related Art

EP-A-0145114 describes a pipe freezing apparatus which is particularly suited to freezing water in pipes, to enable a pipe to be cut without draining the system. A freezer head is attached to the pipe to each side of the region to be worked on, and plugs of frozen water are formed in the pipe, at the location of the freezer heads. The freezer heads constitute expansion chambers, liquid refrigerant being pumped (or drawn) into the chamber and evaporating in the chamber to cool the chamber walls. This arrangement is well known.

Typically a refrigeration system is controlled by a thermostat or pressure switch which turns the compressor off at the required setting. An adjustable thermostatic expansion device may also be used. These controls are not suitable or not convenient for pipe freezing apparatus because the freezer heads are on flexible hoses and at some distance from the compressor.

Some known types of pipe freezing apparatus require periodic manual operation thereof in order to effectively freeze the liquid in a pipe. Thus, for example, it may be necessary to release refrigerant into the freezer head (or jacket surrounding the evaporation chamber) for 90 seconds and then a further 60 seconds after a delay of 2 minutes. Further variable periods of refrigerant release may be required after varying delay times have elapsed, depending upon many factors, including pipe diameter. In fact, this sequence of varying periods required to effect a freeze, can take a relatively long time, during which an operator must be in constant attendance.

Furthermore, after the freeze has been effected, and an ice plug has been formed, some types of pipe freezing apparatus require the operator to return to the freezer head (or jacket) to release an extra burst of refrigerant, otherwise the ice plug may thaw. This manual maintenance of the ice plug is again time consuming and often necessitates inconvenient interruptions of an operator's work schedule.

SUMMARY OF THE INVENTION

A first aspect of the present invention provides a pipe freezing apparatus comprising two or more freezer heads for attachment to a pipe, means for feeding refrigerant through the freezer heads, and means for switching the refrigerant flow between the freezer heads. Preferably the switching means comprises a valve controlled by a timer for switching the refrigerant flow at predetermined intervals.

When using a compressor to circulate refrigerant through the freezer heads, the rate of refrigerant flow through a freezer head can be increased for a given compressor size, by providing the switching means, as compared to the prior art system.

With more than two freezer heads, the switching means may be arranged to feed refrigerant to each one in turn, or to cycle through the freezer heads to isolate each one in turn from the refrigerant flow, or feed the freezer heads in some other combination.

The compressor can be run continuously and the flow of refrigerant is diverted to each freezer head in turn.

By intermittently interrupting the flow of refrigerant to a freezer head, the efficiency of cooling the head can be improved.

The switching means is preferably fitted in the refrigerant supply lines to the freezer heads, and near the compressor.

When the supply line to a freezer head is shut off, the compressor will continue to draw refrigerant from the freezer head, creating a lower pressure in the freezer head. When the switching means is operated to allow refrigerant to flow to the freezer head, there will be an increased rate of flow of refrigerant into the freezer head due to the lower pressure, giving rise to increased cooling. Thus, it is possible to generate a lower temperature at the freezer head.

The switching means may be fitted in a refrigerant suction line, exiting the freezer head and the stop-start operation at a freezer head will also provide enhanced control of the cooling cycle at the freezer head. The pressure in the freezer head which is not in circuit with the compressor (i.e., no refrigerant is flowing through the head) will increase, but there will be enhanced pressure reduction in the freezer head which is still in circuit with the compressor.

A second aspect of the invention provides pipe freezing apparatus comprising a source of refrigerant, two or more freezer heads for attachment to a pipe, the freezer heads being connected to the source of refrigerant, valve means for controlling the flow of refrigerant from the source to the freezer heads, and a timer for controlling the valve means.

The timer, which preferably comprises an electronic circuit, is designed and programmed so as to automate the task of effecting a freeze, using, for example, gas cylinders. An operator can choose the required program from a menu, depending on the size of the pipe to be frozen. Each program is preset with appropriate refrigerant supply times and delay periods.

The timer circuit electronically controls the valve means so as to perform the periodic supply of refrigerant necessary to create and maintain the ice plug, the selected program causing the required amount of refrigerant to be injected at predetermined intervals as required.

In general, a pipe freezing apparatus according to the present invention, which incorporates a valve and control means for injecting refrigerant to the freezer heads as required, eliminated the need for a pressurestat or thermostat within the system, as the pressure in the freezer heads is controlled by the device of the present invention.

The electronically controlled valve unit according to one preferred embodiment of the present invention is incorporated at the compressor part of a pipe freezing apparatus, thereby making it unnecessary to fit any part of the unit at the inlets to the freezer heads, which may be inconvenient.

The required refrigerant injection into the or each freezer head (or evaporator) is effected by opening and closing a valve for preset times. Such times are evaluated on the basis of desired evaporator pressure, the compressor volumetric flow rate (duty) and the size of the liquid line feeding the evaporator.

A third aspect of the present invention provides a refrigeration apparatus comprising a source of refrigerant, one or more evaporators connected to the source of refrigerant, valve means for controlling the flow of refrigerant from the source to the or each evaporator, and a timer for controlling the valve means.

Other preferred features and advantages of the invention will be apparent from the following description and the accompanying claims.

BRIEF DESCRIPTION OF THE DRAWINGS

The invention will be further described by way of example, with reference to the accompanying drawings, in which:

FIG. 1 illustrates an embodiment of a pipe freezing apparatus 2 in accordance with the invention. A detailed description of such apparatus is given in EP-A-0145114. In the apparatus 2, a compressor 4 pumps refrigerant through a condenser 6, to a filter and dryer 8, and a valve 10. Valve 10, which will be described in more detail hereinafter, feeds the condensed refrigerant to one of two freezer heads 12a, 12b via a respective line 14a, 14b. The refrigerant evaporates in the freezer head to cool it and is returned to the compressor 4 via a return line 16a, 16b.

FIG. 2 shows schematically a first embodiment of a control valve of the invention. An electronically operated valve 10' has an inlet 18 from the condenser 6 and filter/dryer 8, and outlets 20a, 20b, which are connected to the lines 14a, 14b. An electric clock 26 controls rotary movement of a valve member 24 to connect alternately the inlet 18 with and outlet 20a or 20b.

Figure 1:
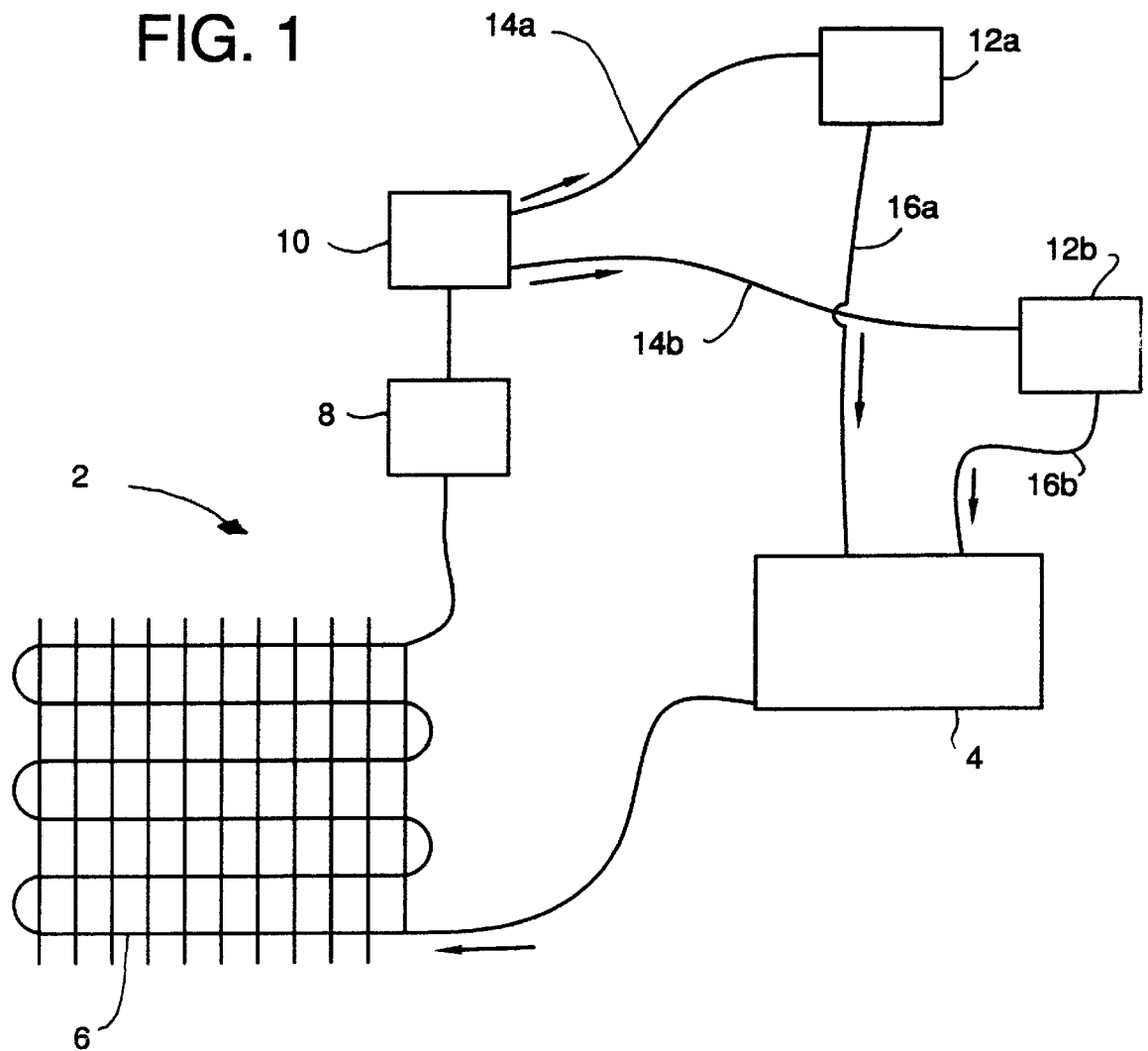
FIG. 1 is a schematic view of a pipe freezing apparatus in accordance with the invention.
Figure 2:
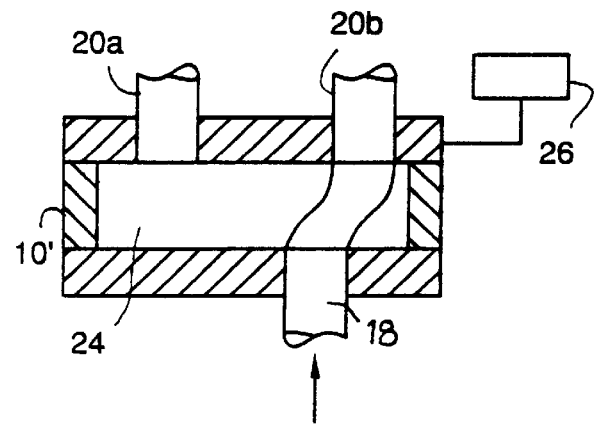
FIG. 2 is a schematic illustration of a first embodiment of a switching means in accordance with the invention.
Figure 3:
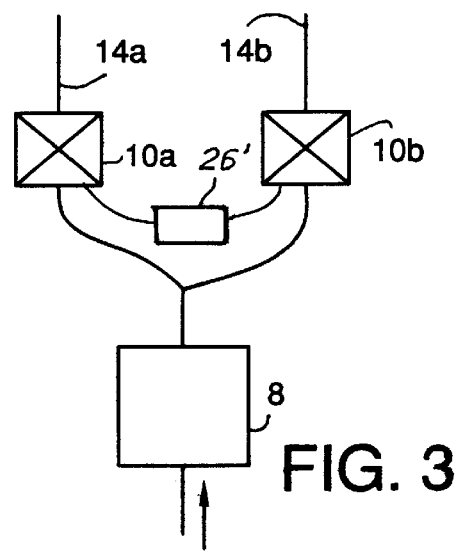
FIG. 3 is a schematic illustration of a second embodiment of a switching means in accordance with the invention.

In the embodiment of FIG. 3, separate on off valves 10a, 10b are provided for each line 14a, 14b, but are controlled from a single electronic module 26'. The line from the filter/dryer 8 is branched to feed the two valves. In use, the compressor 4 is run continuously and refrigerant is fed alternately to the freezer heads 12a, 12b by operation of the control valves 10a, 10b.

The timing of the switching of the valve 10 is preferably pre-set by the manufacturer. With the valve 10 upstream of the freezer head, the valve is timed to connect a freezer head in circuit with the compressor just as the pressure in the freezer head falls to the lower limit of the vacuum which can be achieved by the compressor.

It will be appreciated that the valve 10 may be operated by a mechanical timer, such as by clockwork or an electro-mechanical device.

A specific description of a control circuit 26' for controlling the on off valves 10a, 10b in the apparatus of the present invention will now follow.

Figure 4:
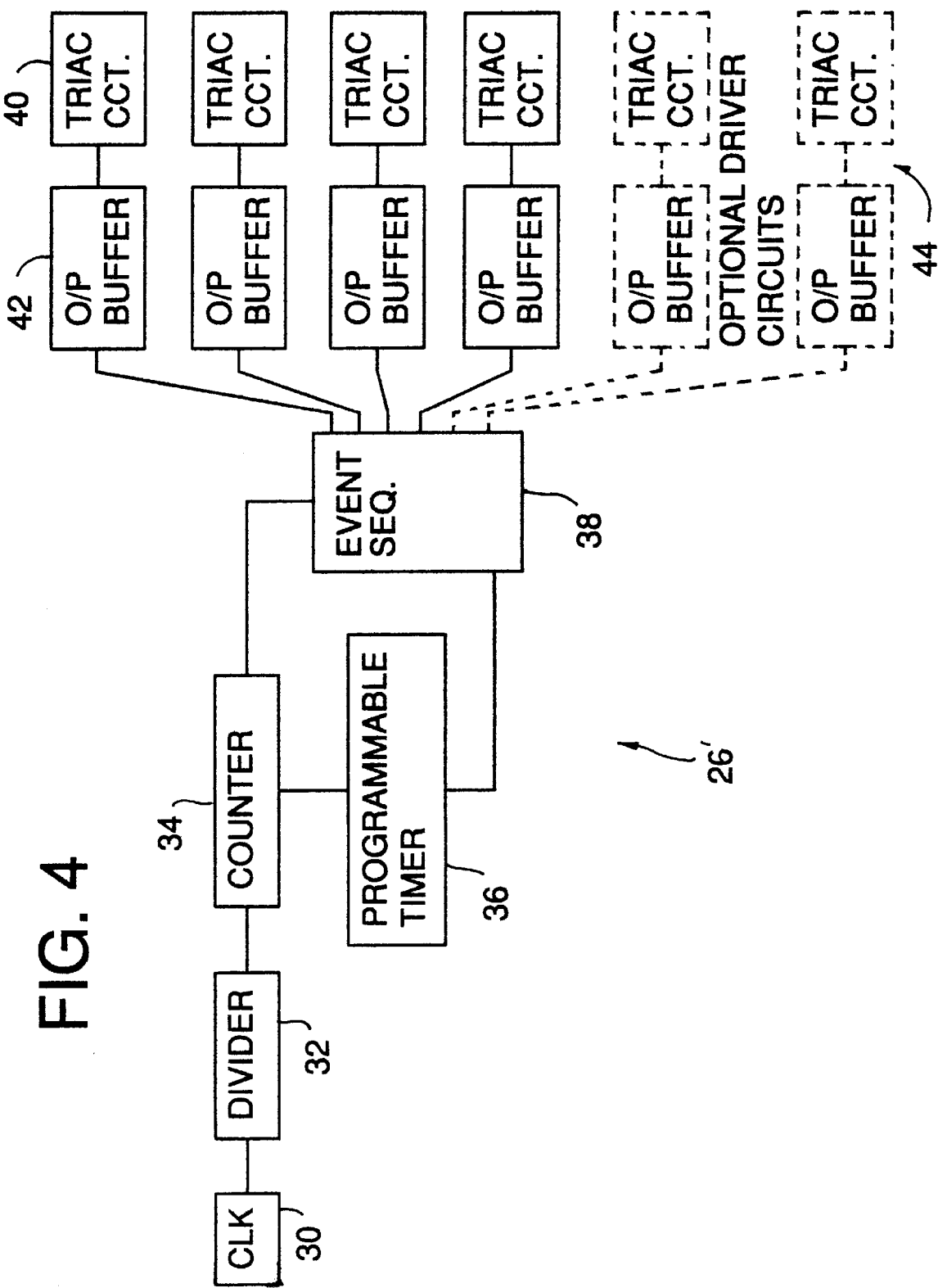
FIG. 4 is a schematic block diagram of a control circuit for controlling the supply of refrigerant to the freezer heads of the pipe freezing apparatus of the present invention.

Referring to FIG. 4 of the drawings, one embodiment of a control circuit 26' for controlling the operation of the on-off valves 10a, 10b in the apparatus of the present invention comprises a clock circuit 30 for providing a high frequency clock signal and a divider 32, the output of which provides a 1 Hz clock signal for use by all of the logical elements of the circuit. The circuit further includes a counter 34 for counting relative time, i.e. the time in seconds which has elapsed since the circuit was reset.

The output of the counter 34 is applied to a programmable timer 36 and an event sequencing circuit 38. The output of the event sequencing circuit 38 controls one or more driver circuits 44, each comprising a triac circuit 40 and an output buffer 42. A driver circuit 44 is provided for each valve to be controlled.

Figure 5:
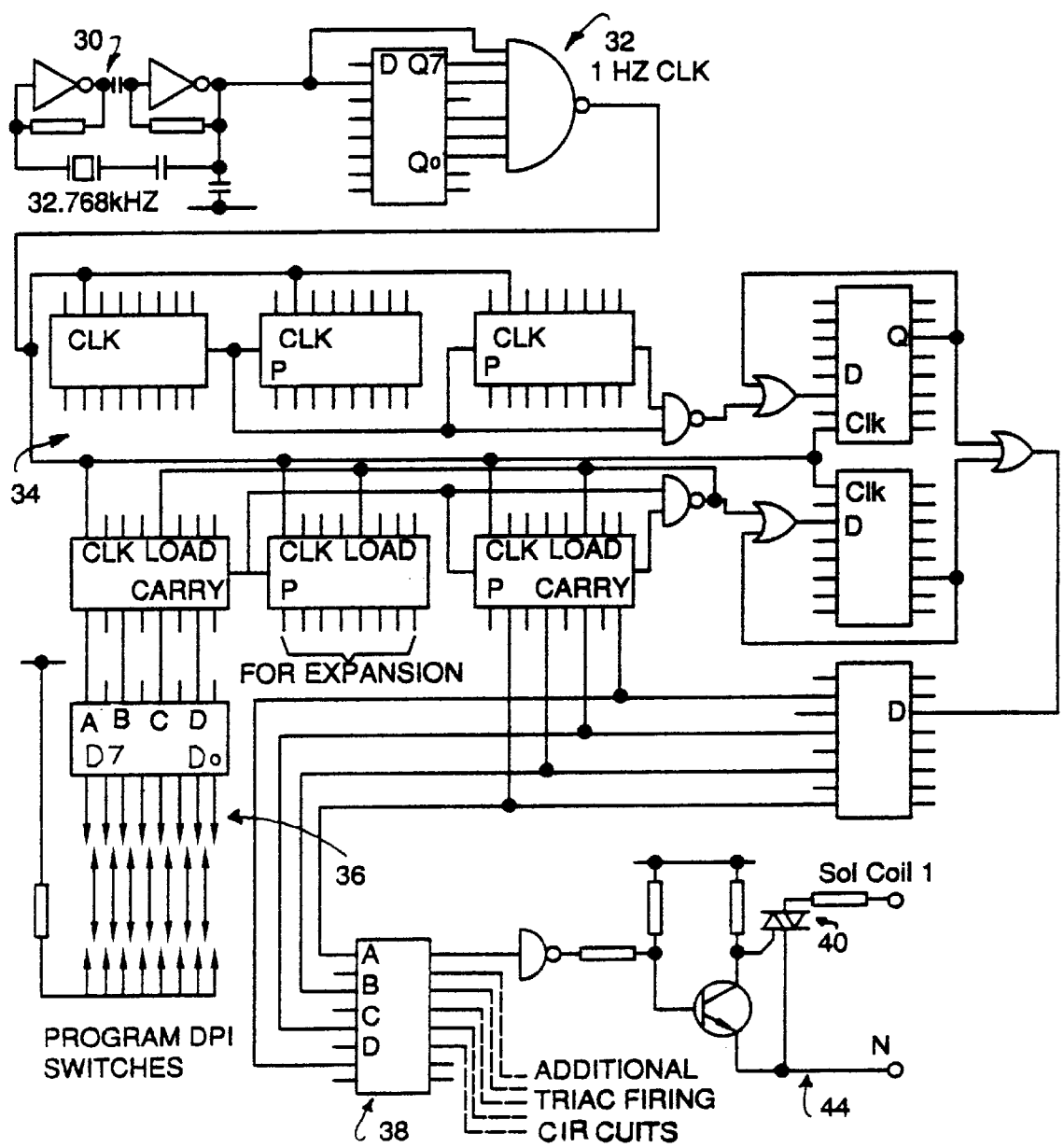
FIG. 5 is a circuit diagram of the circuit of FIG. 4.
Figure 6:
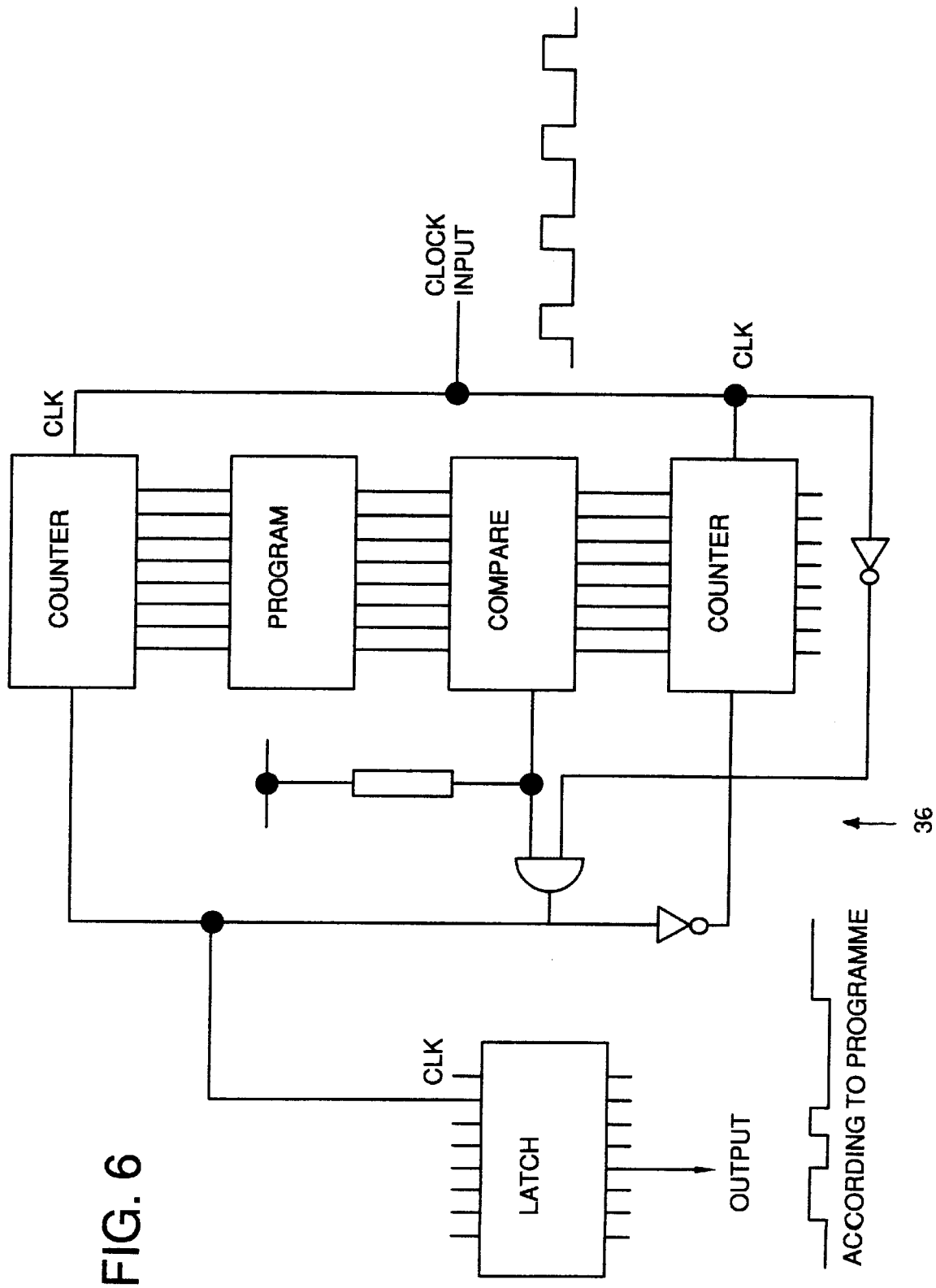
FIG. 6 is a circuit diagram of an alternative programmable timer for use in the control circuit of FIG. 4.

Referring to FIG. 5 of the drawings, the clock circuit 30, the divider circuit 32 and the counter circuit 34 are known in the art, and will not be described in detail here. The counter circuit 34 provides a relative time signal to the programmable timer 36 and the event sequencing circuit 38.

The required opening and closing sequences for the on-off valves is input by the operator by selecting a program according to the diameter of the pipe to be frozen. The program is selected via the programmable timer 36 in which a number of different programs can be stored. The chosen sequence of events is input to the event sequencing circuit 38 which triggers the triac circuits 40 accordingly. Thus, the valves 10a, 10b can be opened and closed for the preset times. Such times are calculated or evaluated by knowing the desired pressure of the freezer heads, the compressor volumetric flow rate (duty) and the size of the liquid line feeding the freezer heads.

Figure 7:
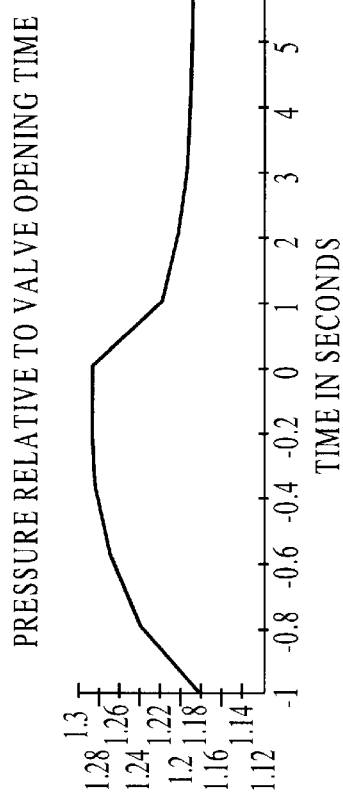
FIG. 7 is a graph showing pressure relative to valve opening.
Figure 8:
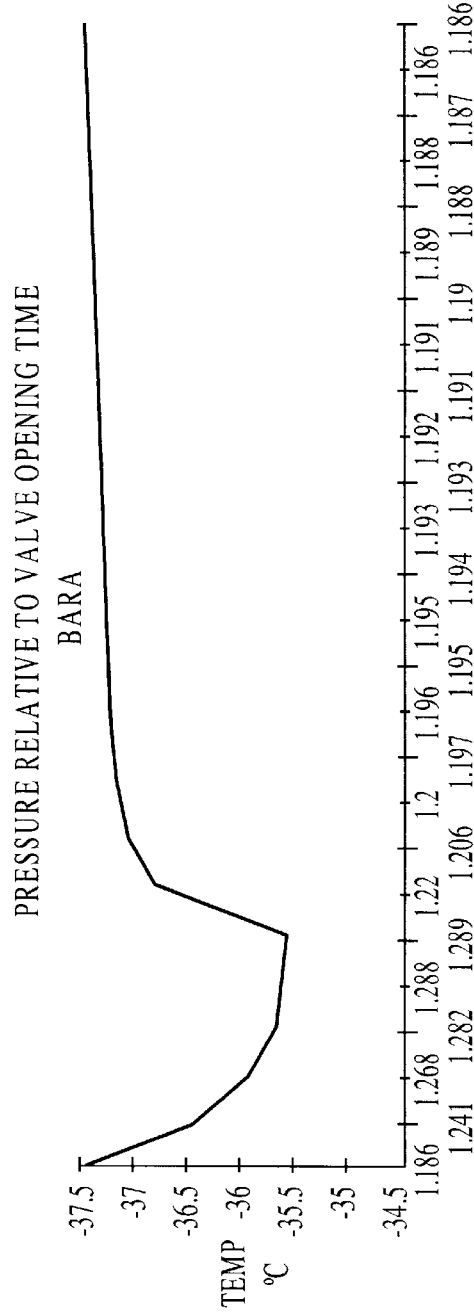
FIG. 8 is a graph showing theoretical temperature control during valve opening.

The charts of FIGS. 7 and 8 are generated from results of tests carried out with evaporators attached to 35 mm copper piped and filled with water.

PRESSURE RELATIVE TO VALVE OPENING

As shown in the graph of FIG. 7, the moment the valve opens and injection of the refrigerant into the evaporator causes an increase in flow rate and the brief pressure rise is measured at the compressor suction port. The refrigerant is drawn away from the evaporator and suction port pressure diminishes.

THEORETICAL TEMPERATURE CONTROL DURING VALVE OPENING

The temperature can be controlled and maintained at a stable figure. The graph of FIG. 8 shows a typical refrigerant temperature cycle. Refrigerant hcfc R22 is used in this experiment. Other refrigerants such as cfc and hfc can be used.

FIG. 10 shows and alternative configuration of a programmable timer 36, the operation of which will be apparent to a person skilled in art. The output of the programmable timer is again applied to the event sequencing circuit 38 to control the operation of the on-off valves 10a, 10b.

Many different types of valve may be used in the present invention. Examples are electro-mechanically operated needle valves, or valves having a diaphragm or membrane seat. However, the present invention is not limited to these.

A refrigerant control is the device used in a refrigerant system to change the pressure of the refrigerant. There are many different types of automatic refrigerant flow controls, one of which is a capillary tube. It is well known in the art that the specification of capillary line is based on theory. The actual duty of each compressor varies according to conditions. Furthermore, flow rate requirements and temperatures attained are theoretical, which involves a great deal of trial and elimination when selecting the optimum capillary for a particular system. If the system requirements change, it is very likely that the capillary fitted would no longer suit requiring a completely new design.

Thus, the electronically controlled valve unit described above could be used in the capillary feed system of any refrigeration apparatus, by varying the open and close timings, modified flow rates could then be achieved. For example, a refrigeration system may incorporate an electronically controlled valve unit and a capillary size which allows twice the flow rate required. The valve unit may be set to open for 50% of the time and close for 50% of the time, thereby reducing flow by half. The timings could then be adjusted to achieve higher or lower flow rates, as required.

In the light of this disclosure, modification of the described embodiment, as well as other embodiments, all within the scope of the present invention as defined by the appended claims, will now be apparent to persons skilled in the art.

I claim:

1. Pipe freezing apparatus comprising:

a compressor;

a condenser;

two or more freezer heads for attachment to a pipe, the freezer heads each being connected in circuit with the compressor and the condenser by a respective capillary line extending between the condenser and each freezer head such that the compressor circulates refrigerant through the condenser to a freezer head to cool the freezer head and draws evaporated refrigerant from the freezer head;

valve means provided in circuit with the freezer heads to switch on or off the flow of refrigerant either supplied to or drawn from each freezer head; and a timer provided to control the operation of the valve means, to feed refrigerant in turn to each freezer head to cause freezing of contents of the pipe at each freezer head.

2. Apparatus as claimed in claim 1 wherein the valve is provided in the refrigerant flow path upstream of the freezer heads.

3. Pipe freezing apparatus as claimed in claim 1, in which the timer is programmable and includes a plurality of programs for varying the length of time refrigerant is fed to each freezer head in turn in accordance with the size or temperature of the pipe to be frozen.

4. Apparatus according to claim 3 wherein the programmable timer includes a menu from which the required valve operation sequence can be selected.

* * * * *